(12) United States Patent
Schafer

(10) Patent No.: US 12,344,396 B2
(45) Date of Patent: Jul. 1, 2025

(54) CARGO COMPARTMENT CENTERLINE RESTRAINT

(71) Applicant: GOODRICH CORPORATION, Charlotte, NC (US)

(72) Inventor: Ryan J. Schafer, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 212 days.

(21) Appl. No.: 18/078,701

(22) Filed: Dec. 9, 2022

(65) Prior Publication Data
US 2024/0190568 A1 Jun. 13, 2024

(51) Int. Cl.
*B64D 9/00* (2006.01)

(52) U.S. Cl.
CPC ................... *B64D 9/003* (2013.01)

(58) Field of Classification Search
CPC ...... B64D 9/003; B64D 2009/006; B64C 1/20
See application file for complete search history.

(56) References Cited

U.S. PATENT DOCUMENTS

| | | | |
|---|---|---|---|
| 5,564,654 A * | 10/1996 | Nordstrom | B64D 9/003 248/500 |
| 6,926,481 B2 * | 8/2005 | Huber | B64C 1/20 410/80 |
| 7,429,157 B2 | 9/2008 | Schulze et al. | |
| 7,665,938 B2 | 2/2010 | Schulze | |
| 8,066,458 B2 * | 11/2011 | Schulze | B64C 1/20 410/80 |
| 8,496,418 B2 * | 7/2013 | Huber | B64D 9/003 410/79 |
| 8,690,103 B2 | 4/2014 | Schulze et al. | |
| 2011/0146045 A1 | 6/2011 | Schulze et al. | |
| 2021/0046860 A1 | 2/2021 | Lee et al. | |

FOREIGN PATENT DOCUMENTS

CN 113071682 7/2021

OTHER PUBLICATIONS

European Patent Office, European Search Report dated Mar. 28, 2024 in Application No. 23211527.9.

* cited by examiner

*Primary Examiner* — Brian M O'Hara
(74) *Attorney, Agent, or Firm* — SNELL & WILMER L.L.P.

(57) ABSTRACT

A cargo restraining device is disclosed herein. The cargo restraining device includes a base, a first restraint coupled to the base, the first restraint including a first member coupled orthogonally to a second member and configured to move from a first position to a second position, the first restraint configured to restrain a pallet in a first direction when in the first position, and a second restraint coupled to the base and configured to move from a third position to a fourth position, the second restraint configured to restrain the pallet in a second direction that is orthogonal to the first direction when in the third position.

16 Claims, 9 Drawing Sheets

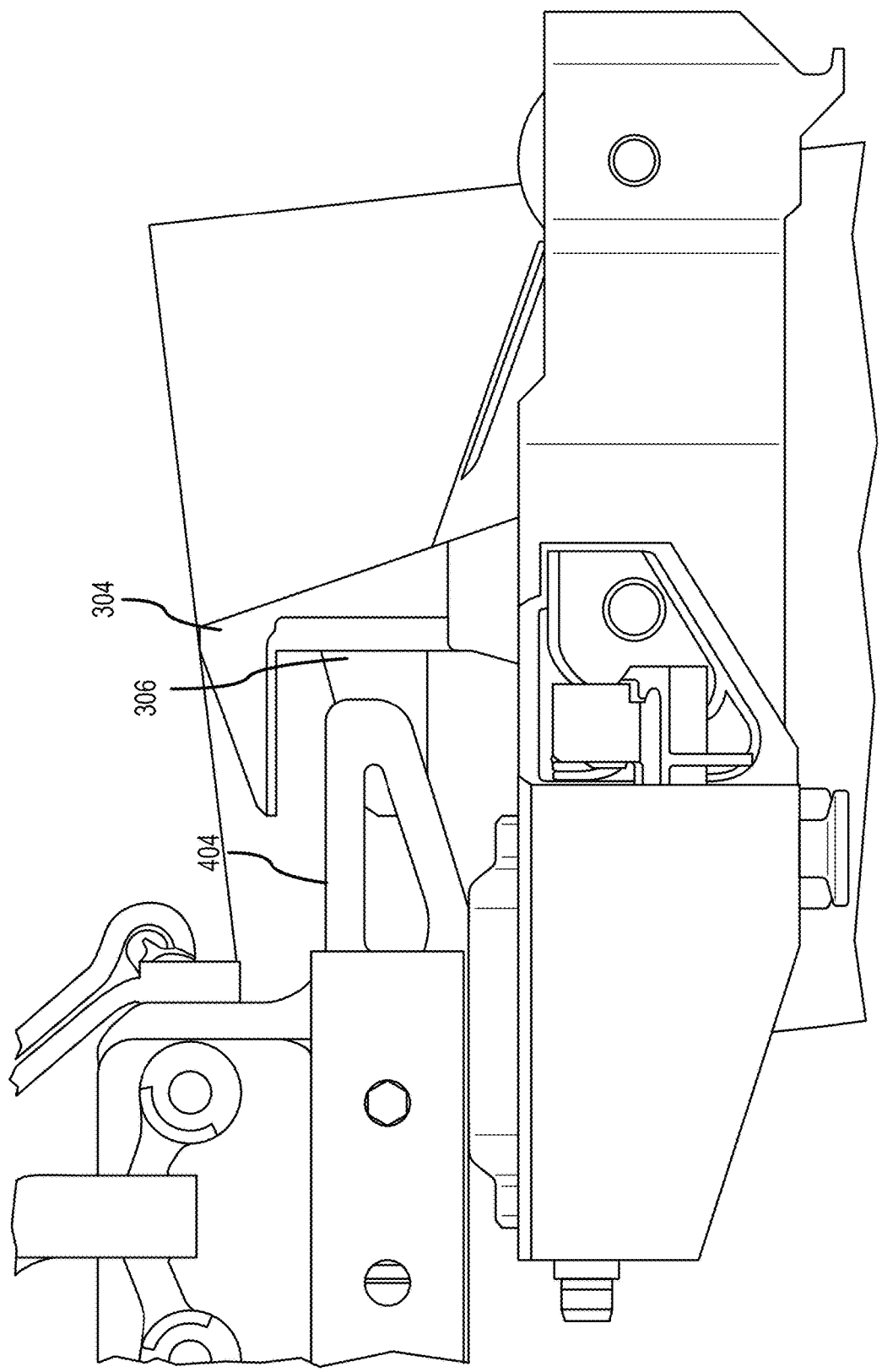

CARGO COMPARTMENT CENTERLINE RESTRAINT

FIELD

The present disclosure generally relates cargo restraining assemblies, and more specifically, to centerline cargo restraining assemblies.

BACKGROUND

Centerline restraint assemblies are used in air cargo compartments with a cargo surface, such as a ball panel, along the centerline of an aircraft away from the cargo loading door of the aircraft. Cargo loaded into the cargo compartment of the aircraft may secured using centerline restraints along the centerline of the aircraft, outboard restraints along the outboard portion of the aircraft, and pallet locks that connect locking one piece of cargo to another. Generally, each restraint and lock restricts movement of the cargo by handling the load of the cargo in a single direction.

Cargo may be strapped to cargo pallets and the cargo pallets stored and secured in the cargo compartment of the aircraft. While generally standardized, cargo pallet standards vary resulting in cargo pallets having different dimensions and features. For example, the 463L cargo pallet has notches around the perimeter of the pallet. The different dimensions and features of the cargo pallets may prevent pallet locks and cargo restraining devices from securing the cargo pallet in the cargo compartment.

SUMMARY

A cargo restraining device is disclosed herein. The cargo restraining device includes a base, a first restraint coupled to the base, the first restraint including a first member coupled orthogonally to a second member and configured to move from a first position to a second position, the first restraint configured to restrain a pallet in a first direction when in the first position, and a second restraint coupled to the base and configured to move from a third position to a fourth position, the second restraint configured to restrain the pallet in a second direction that is orthogonal to the first direction when in the third position.

In various embodiments, the cargo restraining device further includes a rounded end formed in the second member of the first restraint, opposite the first member, a first spring configured to move the first restraint from the second position to the first position, and a stop configured to engage the rounded end of the first restraint to hold the first restraint in the first position. In various embodiments, the cargo restraining device further includes a cutout formed in the first member and a detent disposed within the base and configured to engage the cutout of the first restraint and secure the first restraint in the second position. In various embodiments, the detent is spring loaded.

In various embodiments, the cargo restraining device further includes a shoulder formed in the second restraint, a second spring configured to move the second restraint from the third position to the fourth position, and a support configured to engage the shoulder of the second restraint to secure the second restraint in the third position. In various embodiments, the cargo restraining device further includes a tension stud coupled to the base and a shear plunger coupled to the base adjacent the tension stud, wherein the tension stud and the shear plunger are configured to engage a first cargo infrastructure and secure the base to the cargo restraining device to the first cargo infrastructure.

In various embodiments, the cargo restraining device further includes a tension bar coupled to the base opposite the tension stud, the tension bar configured to engage a second cargo infrastructure and secure the base to the second cargo infrastructure. In various embodiments, the first restraint is further configured to restrain the pallet in a third direction that is orthogonal to both the first direction and the second direction.

Also disclosed herein is a cargo restraining system. The cargo restraining system includes a first seat-track including an inside track and an outside surface, a second seat-track disposed adjacent the first seat-track including an inside track and an outside surface, and a cargo restraining device. The cargo restraining device includes a base having a top side and a bottom side, a tension stud coupled to the bottom side of the base, the tension stud configured to engage the inside track of the first seat-track, a shear plunger extending through the base adjacent the tension stud, the shear plunger configured to translate with respect to the base and engage the outside surface of the first seat-track, a tension bar coupled to the bottom side of the base and configured to engage the inside track of the second seat-track, a first restraint coupled to the top side of the base, the first restraint configured to restrain a pallet in a first direction, and a second restraint coupled to the top side of the base adjacent the first restraint, the second restraint configured to restrain the pallet in a second direction that is orthogonal to the first direction.

In various embodiments, the first restraint further includes a first member having beveled edges and a second member having beveled edges, the second member orthogonally coupled to the first member. In various embodiments, the cargo restraining device further includes a rounded end formed in the second member of the first restraint, opposite the first member, a first spring configured to move the first restraint from a disengaged position to an engaged position, and a stop coupled to the base and configured to engage the rounded end of the first restraint to hold the first restraint in the engaged position to restrain the pallet.

In various embodiments, the cargo restraining device further includes a cutout formed in the first member and a detent disposed within the base and configured to engage the cutout of the first restraint and secure the first restraint in the disengaged position. In various embodiments, the cargo restraining device further includes rollers coupled to the base, the rollers disposed below the first member when the first restraint is in the engaged position.

In various embodiments, the cargo restraining device further includes a shoulder formed in the second restraint, a second spring configured to move the second restraint from an engaged position to a disengaged position, and a support configured to engage the shoulder of the second restraint to secure the second restraint in the engaged position to restrain the pallet. In various embodiments, the first restraint is further configured to restrain the pallet in a third direction that is orthogonal to the first direction and the second direction.

Also disclosed herein is a cargo restraining device. The cargo restraining device includes a first restraint configured to restrain a pallet in a first direction, a second restraint configured to restrain the pallet in a second direction that is orthogonal to the first direction, and rollers configured for moving the pallet, the rollers disposed below the first restraint.

In various embodiments, the cargo restraining device further includes a rounded end formed in the first restraint, a first spring configured to move the first restraint to a first position to restrain the pallet, and a stop configured to engage the rounded end of the first restraint to hold the first restraint in the first position. In various embodiments, the cargo restraining device further includes a cutout formed in the first restraint and a spring-loaded detent disposed below the first restraint, the spring-loaded detent configured to engage the cutout and secure the first restraint in a second position.

In various embodiments, the cargo restraining device further includes a shoulder formed in the second restraint, a second spring configured to move the second restraint from a third position to a fourth position, wherein the second restraint restrains the pallet in the third position, and a support configured to engage the shoulder of the second restraint to secure the second restraint in the third position. In various embodiments, the cargo restraining device further includes a tension stud and a tension bar, the tension stud and the tension bar configured to secure the cargo restraining device to a cargo compartment.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 4A and 4B illustrate a cargo restraining device restraining a pallet, in accordance with various embodiments.

DETAILED DESCRIPTION

Figure 1:
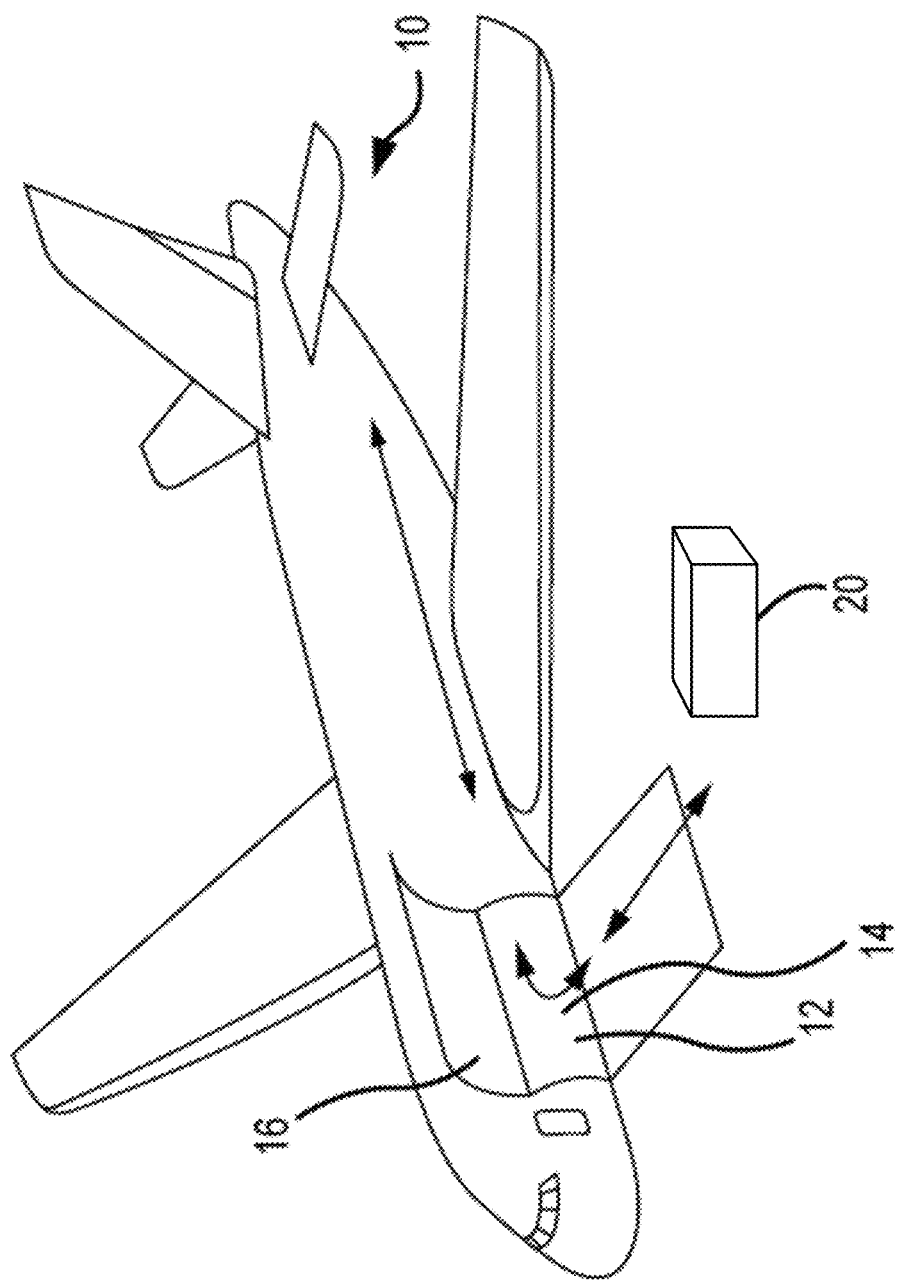
FIG. 1 illustrates a schematic of an aircraft being loaded with cargo, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Cargo restraining devices may be affixed to existing infrastructure in the cargo compartment, such as for example, guide rails and/or seat-track. However, due to differing sizes of cargo pallets and locations of the infrastructure in the cargo compartment, existing cargo restraining devices may not work with some combinations of infrastructure and cargo restraining device. For example, the 463L pallet has notches formed in a lip that extends around the perimeter of the 463L pallet. The dimensions of the 463L pallet and the location of the notches may prevent existing cargo restraining devices (e.g., pallet locks) from functioning properly with arrangements of infrastructure in various airplane layouts.

Disclosed herein is a cargo restraining device for use in a cargo compartment of a vehicle, such as an aircraft. In various embodiments, the cargo restraining device is configured for use along the centerline of the cargo compartment. In various embodiments, the cargo restraining device is configured to slide into existing cargo compartment infrastructure, such as seat-track, and includes a first spring loaded restraint and a second spring loaded restraint. In various embodiments, the cargo restraining device includes a set of tension studs configured to engage a first seat-track and a tension bar configured to engage a second seat-track. In various embodiments, the size and dimensions of the cargo restraining device may be modified to fit different cargo compartment infrastructure configurations.

First spring loaded restraint is biased to the engaged, or up, position and prevents movement of cargo in a vertical direction and a lateral (e.g., side to side) direction. Second spring loaded restraint is biased to the disengaged, or down, position and prevents movement of cargo in a longitudinal (e.g., fore to aft) direction. First and second spring loaded restraints are independently operable. For example, first spring loaded restraint may be engaged and second spring loaded restraint may be disengaged during the loading and unloading of cargo. First spring loaded restraint may provide guidance and safety during movement of cargo. Second spring loaded restraint is engaged to lock the cargo in place for transit. In various embodiments, the cargo restraining device includes rollers over which the cargo moves during loading and unloading.

In various embodiments, first spring loaded restraint may be disengaged to during loading and unloading of cargo when cargo is loaded and unloaded over the aircraft centerline. In various embodiments, the cargo includes pallets (e.g., 463L pallets) having a lip where the lip moves between the rollers of the cargo restraining device and the first spring loaded restraint. In various embodiments, first spring loaded restraint has beveled edges to guide the lip of the pallet during loading and unloading. In various embodiments, second spring loaded restraint may engage notches formed in the lip of the pallet.

Referring to FIG. 1, in accordance with various embodiments, a perspective view of an aircraft 10 is illustrated.

Aircraft 10 includes a cargo deck 12 located within a cargo compartment 14. Aircraft 10 may comprise a cargo load door 16 located, for example, at one side of a fuselage structure of aircraft 10. A unit load device (ULD) 20, in the form of a container or pallet, for example, may be loaded through cargo load door 16 and onto cargo deck 12 of aircraft 10 or, conversely, unloaded from cargo deck 12 of aircraft 10. A "ULD", as used herein, includes a container, pallet, or other cargo of any size, shape, configuration, and/or type. In general, ULDs are available in various sizes and capacities, and are typically standardized in dimension and shape. Once loaded with items destined for shipment, ULD 20 is transferred to aircraft 10 and then loaded onto aircraft 10 through cargo load door 16 using a conveyor ramp, scissor lift or the like. As illustrated, ULD 20 is loaded laterally (e.g., the negative y-direction) into cargo compartment 14. Once inside aircraft 10, ULD 20 may be moved longitudinally (e.g., the x-direction) cargo compartment 14 to a final stowed position. Straps may be used to secure ULD 20 in the final stowed position to minimize, or prevent, movement of ULD 20 during transport. Multiple ULDs may be brought on-board aircraft 10, with each ULD 20 being placed in a respective stowed position on cargo deck 12. One or more final ULDs 20 may be loaded laterally into cargo compartment 14 but not moved longitudinally within cargo compartment 14. After aircraft 10 has reached its destination, each ULD 20 is unloaded from aircraft 10 in similar fashion, but in reverse sequence to the loading procedure. To facilitate movement of ULD 20 along the cargo deck 12, aircraft 10 may include a cargo handling system as described herein in accordance with various embodiments.

Figure 2A:
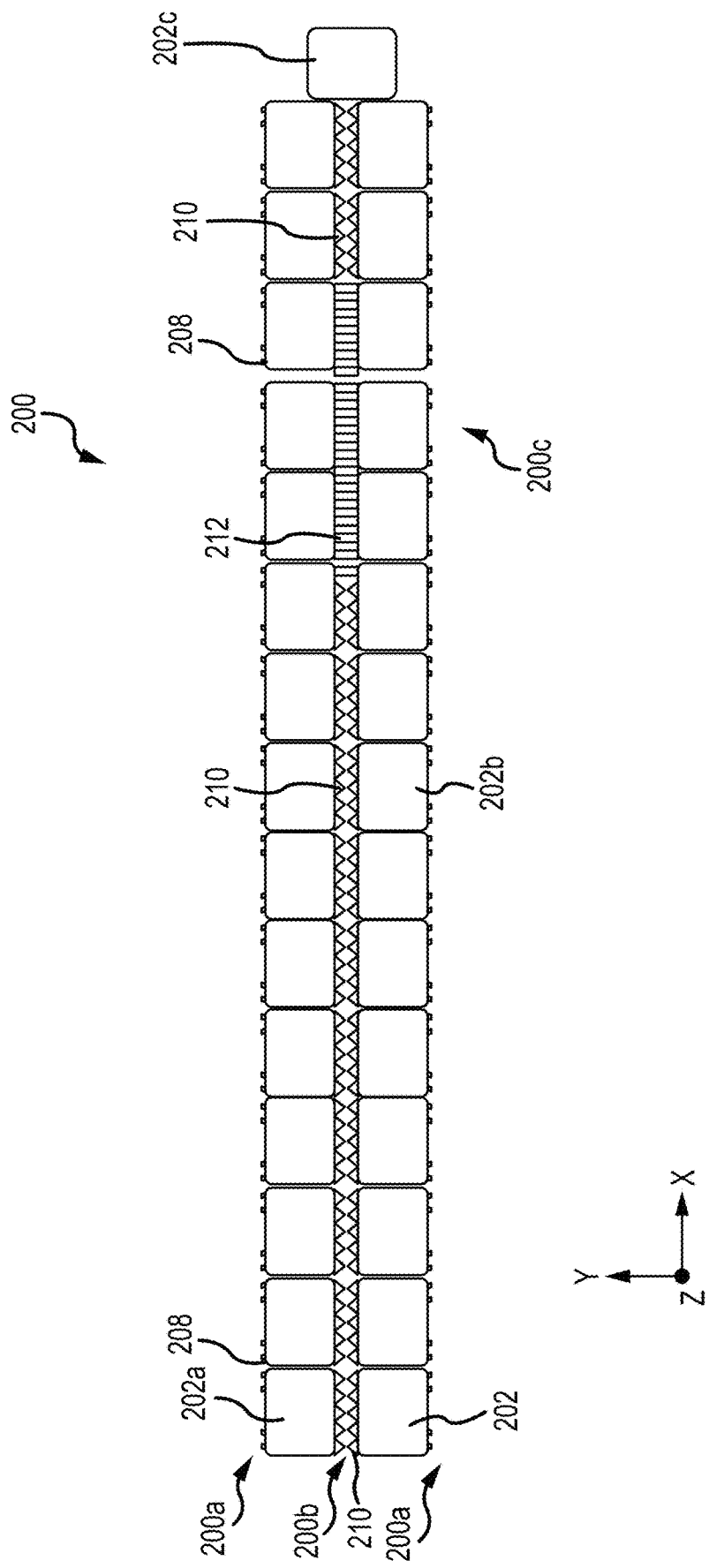
FIGS. 2A and 2B illustrate schematics of an aircraft cargo loading layout including cargo restraints, in accordance with various embodiments.
Figure 2B:
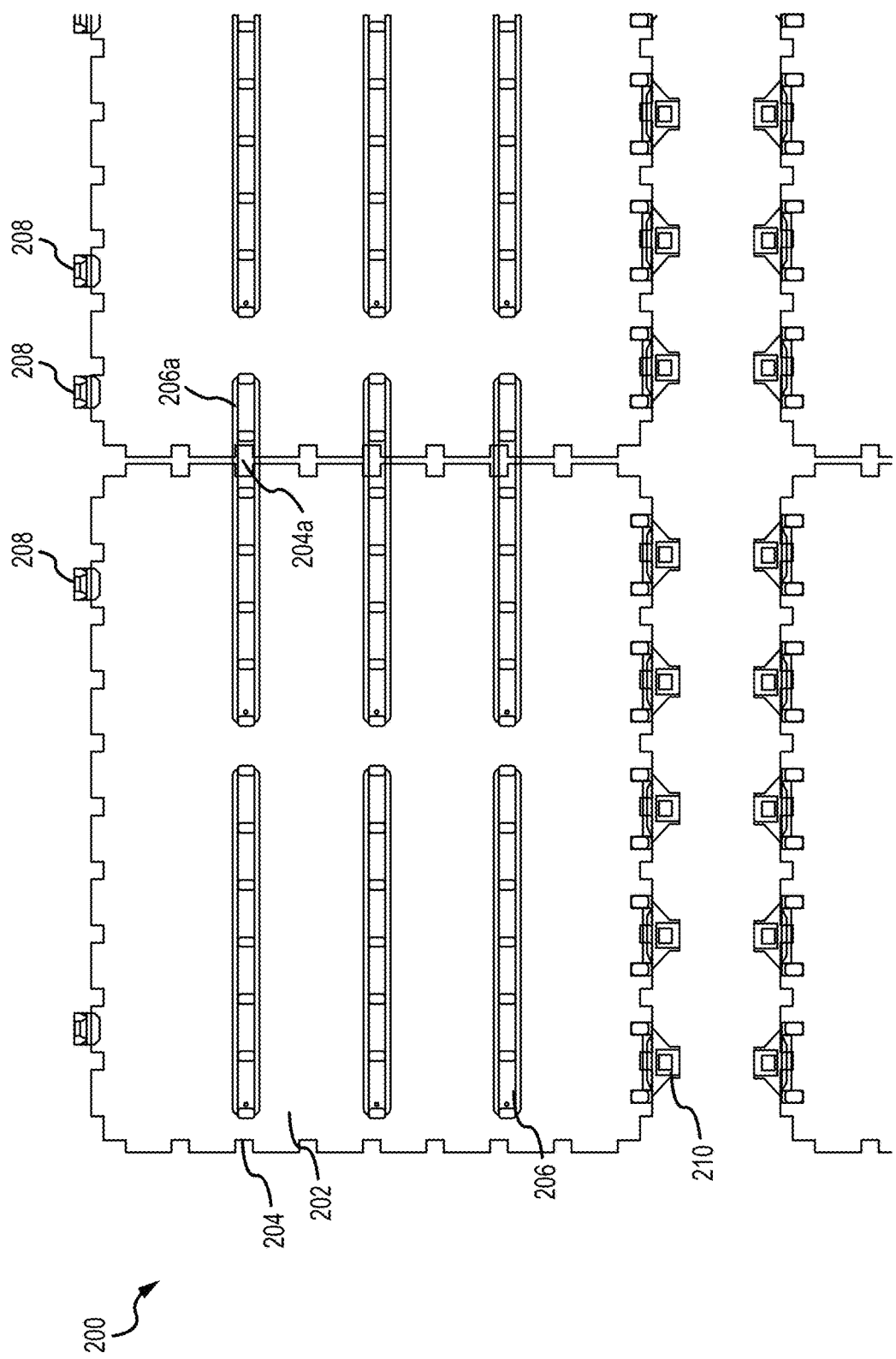

Referring now to FIGS. 2A and 2B, a schematic of a cargo compartment 200 of an aircraft 10 is illustrated, in accordance with various embodiments. In various embodiments, cargo compartment 200 may be an example of cargo deck 12 described above with respect to FIG. 1. Cargo compartment 200 is configured to store a plurality of cargo pallets 202 including a first cargo pallet 202*a*, a second cargo pallet 202*b*, and a third cargo pallet 202*c*. First cargo pallet 202*a* may be stored along a first side of cargo compartment (e.g., the plurality of cargo pallets 202 may include any type of cargo pallet). In the depicted embodiment, the plurality of cargo pallets 202 includes 463L cargo pallets having notches 204 around a perimeter of each cargo pallet 202. Cargo compartment 200 further includes cargo restraining infrastructure 206, as illustrated in FIG. 2B. Cargo restraining infrastructure 206 may include rails, support track, or seat-track, among others. Various combinations of cargo pallets 202 and cargo restraining infrastructure 206 restrict the use of certain types of restraint devices for use in securing cargo pallets 202 for transport. For example, as illustrated in FIG. 2B, a cargo restraining infrastructure 206*a* is located under notch 204*a* of two adjacent cargo pallets 202. The location of notch 204*a* and cargo restraining infrastructure 206*a* may prevent the use of pallet locks for securing the cargo pallets in the fore and aft directions (e.g., the X direction).

Cargo compartment 200 further includes outboard portions 200*a*, a centerline portion 200*b*, and a door portion 200*c*. The plurality of cargo pallets 202 may be secured for transport using a plurality of outboard restraint devices 208, a plurality of cargo restraining devices 210, and a plurality of door area restraint devices 212. Outboard restraint devices 208 may be used to secure cargo pallets 202 along outboard portions 200*a* of cargo compartment 200. Door area restraint devices 212 may be used to secure cargo pallets 202 along centerline portion 200*b* within door portion 200*c* of cargo compartment 200. cargo restraining devices 210 may be used to secure cargo pallets 202 along centerline portion 200*b* outside of door portion 200*c* of cargo compartment 200. Each of outboard restraint devices 208, cargo restraining devices 210, and door area restraint devices 212 may be secured to cargo restraining infrastructure 206 in cargo compartment 200.

In various embodiments, outboard restraint devices 208 may be configured to secure cargo pallets 202 laterally (e.g., the Y direction) within cargo compartment 200. In various embodiments, door area restraint devices 212 may be configured to secure cargo pallets 202 laterally (e.g., the Y direction) and longitudinally (e.g., the X direction) during transport. Furthermore, door area restraint devices 212 may be configured to move cargo pallets 202 laterally (e.g., the Y direction) out through a door (e.g., door 16) of aircraft 10. In various embodiments, cargo restraining devices 210 may be configured to secure cargo pallets 202 laterally (e.g., the Y direction), longitudinally (e.g., the X direction), and vertically (e.g., the Z direction). In various embodiments, cargo restraining devices 210 may be configured to fold down, or collapse, so that third cargo pallet 202*c* may be moved into position while cargo restraining device 210 is installed. In various embodiments, cargo restraining device 210 may be configured to provide longitudinal guidance (e.g., the X direction) while moving cargo pallets 202 longitudinally within cargo compartment 200. Accordingly, cargo restraining device 210 provides effective and flexible cargo pallet 202 restraint in cargo compartment 200 for use with different combinations of cargo pallet 202 and cargo restraining infrastructure 206.

Figure 3B:
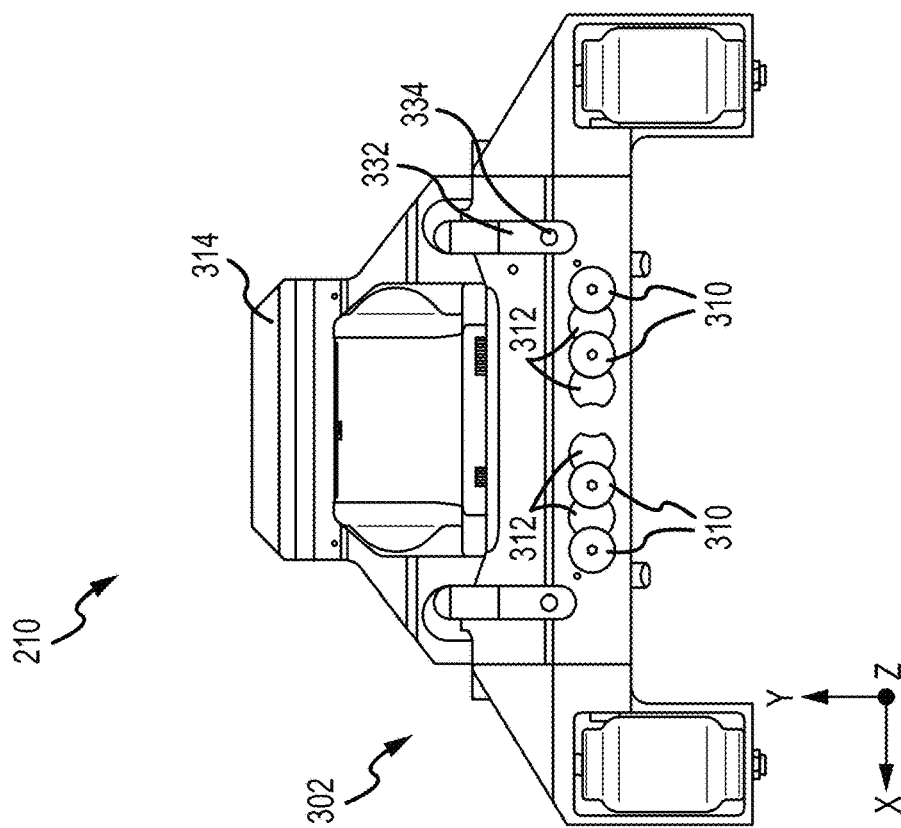
FIGS. 3A, 3B, 3C, and 3D illustrate a cargo restraining device, in accordance with various embodiments.
Figure 3A:
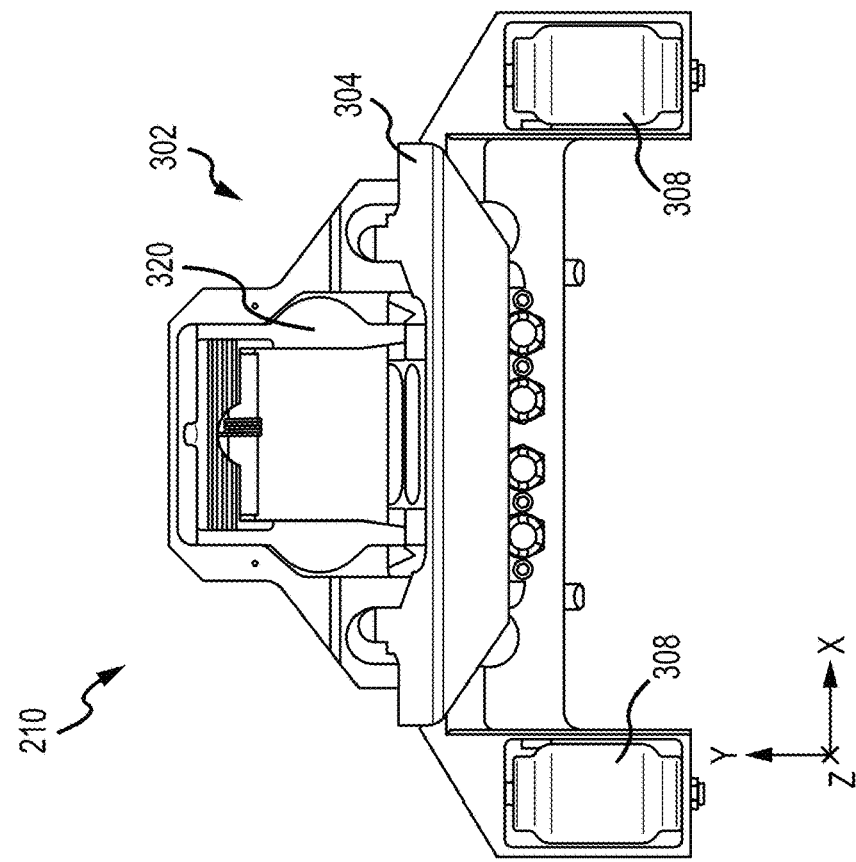
Figure 3D:
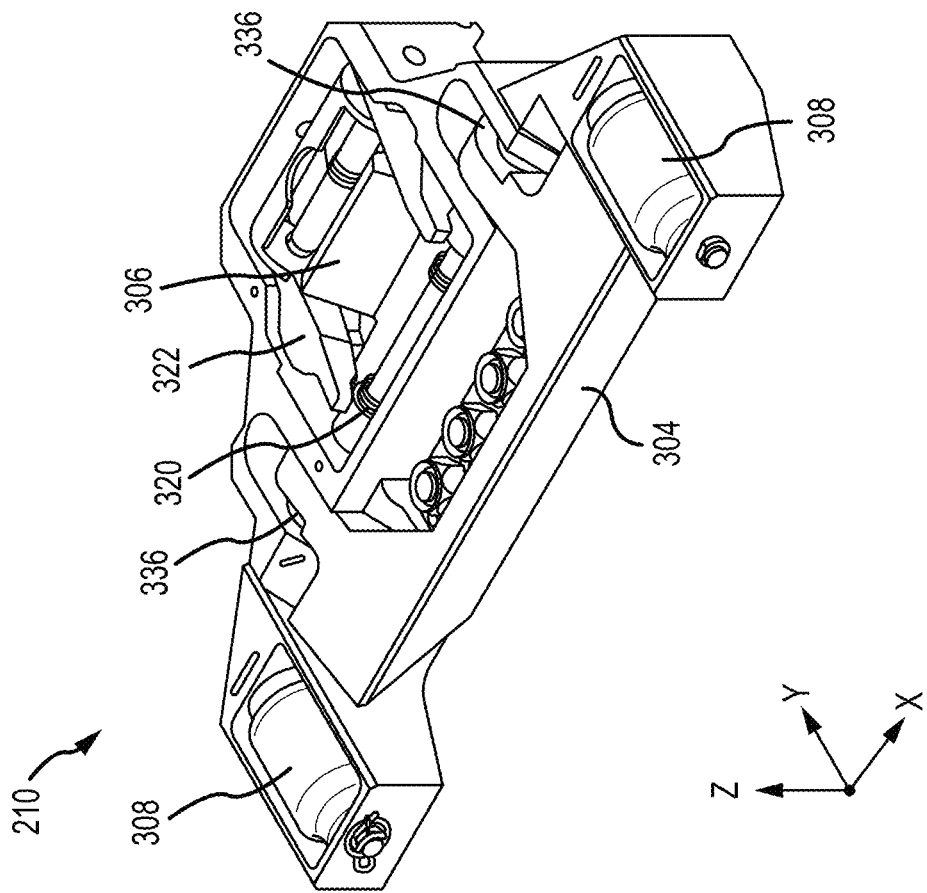
Figure 3C:
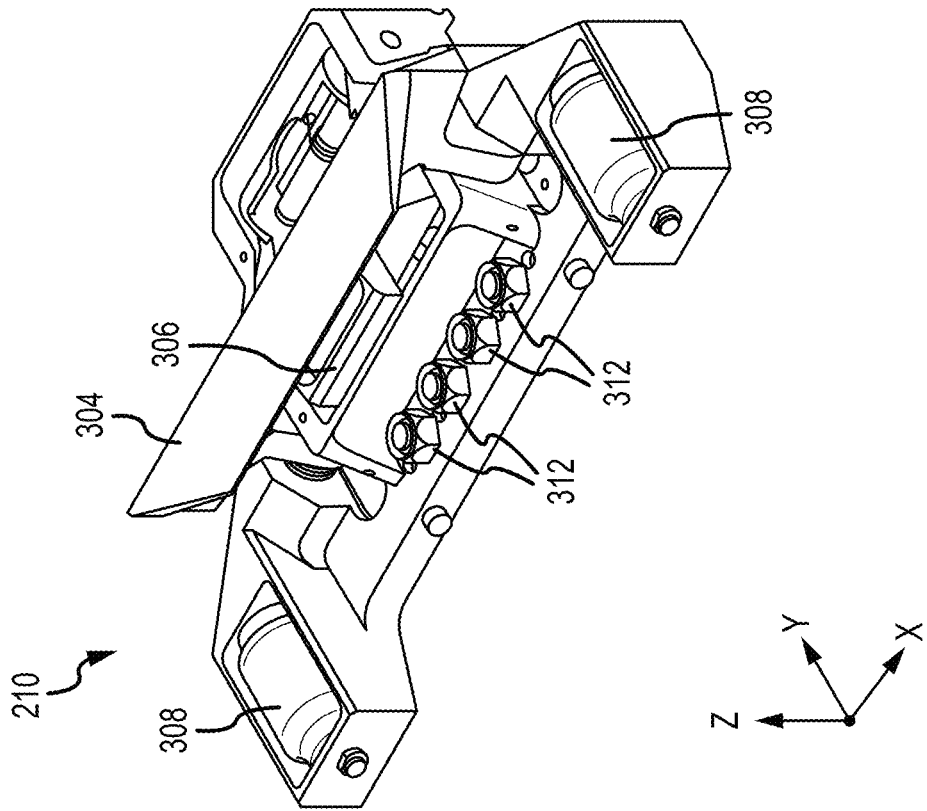

Referring now to FIGS. 3A-3D, multiple views of a cargo restraining device 210 are illustrated, in accordance with various embodiments. FIG. 3A illustrates a top-down view (e.g., the negative Z direction) of cargo restraining device 210. FIG. 3B illustrates a bottom-up view (e.g., the Z direction) of cargo restraining device 210. FIG. 3C illustrates an isometric view of cargo restraining device 210 in an open, or engaged, position. FIG. 3D illustrates an isometric view of cargo restraining device 210 in a closed, or disengaged, position. FIG. 3E illustrates an isometric view of cargo restraining device 210 in a partially open, or partially engaged, position.

Cargo restraining device 210 includes a base 302, a first restraint 304, a second restraint 306, rollers 308, tension studs 310, shear plungers 312, and tension bar 314. The components of cargo restraining device 210 may be made from steel, aluminum, steel alloys, or aluminum alloys, among other materials. In various embodiments, base 302, tension studs 310, and tension bar 314 may be made from steel. In various embodiments, first restraint 304, second restraint 306, and rollers 308 may be made from aluminum. Base 302 may be a single monolithic piece or be made from multiple pieces joined together. In various embodiments, the multiple pieces may be irreversibly joined together.

Tension studs 310 may be coupled to the bottom (e.g., the negative Z direction) of base 302 allowing cargo restraining device 210 to interface with a first cargo restraining infrastructure 206 (e.g., seat-track) within cargo compartment 200. In various embodiments, tension studs 310 may slide into openings in first cargo restraining infrastructure 206 and along first cargo restraining infrastructure 206 to a desired location. Tension bar 314 may be formed into base 302, or coupled to base 302, along a backside (e.g., the Y direction) of base 302 allowing cargo restraining device 210 to interface with a second, adjacent, cargo restraining infrastructure 206 within cargo compartment 200. In various embodiments, tension bar 314 may slide into openings in second cargo restraining infrastructure 206 and along second cargo restraining infrastructure 206 to the desire location.

After reaching the desired location, cargo restraining device 210 may be secured in position by tightening shear plungers 312 located adjacent tension studs 310. The tension studs 310 engage a first side of first cargo restraining infrastructure 206 and shear plungers engage a second side of first cargo restraining infrastructure 206, securing cargo restraining device 210 in place. Tension bar 314 engages second cargo restraining infrastructure 206, preventing rotational movement of cargo restraining device 210. Tension bar 314 is designed to slide through and engage second cargo restraining infrastructure 206 regardless of the presence of holes or other obstacles within second cargo restraining infrastructure 206. In the illustrated embodiments, tensions studs 310 and tension bar 314 are spaced to fit with first cargo restraining infrastructure 206 being at a first position (e.g., buttock line 11 where a buttock line is a line parallel to the longitudinal axis of an aircraft) and second cargo restraining infrastructure 206 being at a second position (e.g., buttock line 6.5). In various embodiments, base 302 may be modified so that the distance between tension studs 310 and tension bar 314 accommodates first and second positions that are closer together or further apart.

First restraint 304 provides restraint in laterally (e.g., in the Y direction) and vertically (e.g., in the Z direction). First restraint 304 is configured to move between an engaged, or raised, position (e.g., FIG. 3C) and disengaged, or lowered, position (e.g., FIG. 3D). Second restraint 306 provides restraint longitudinally (e.g., in the X direction). Second restraint 306 is configured to move between an engaged, or raised, position (e.g., FIG. 3C) and a disengaged, or lowered, position (e.g., FIG. 3D). First restraint 304 and second restraint 306 are configured to move independently from each other. That is, first restraint 304 may be engaged and second restraint 306 may be disengaged while moving cargo (e.g., pallets) longitudinally (e.g., the X direction) within cargo compartment 200. Cargo may be moved across rollers 308 and be guided by first restraint 304, preventing excessive movement laterally (e.g., the Y direction) and vertically (e.g., the Z direction).

Figure 4A:
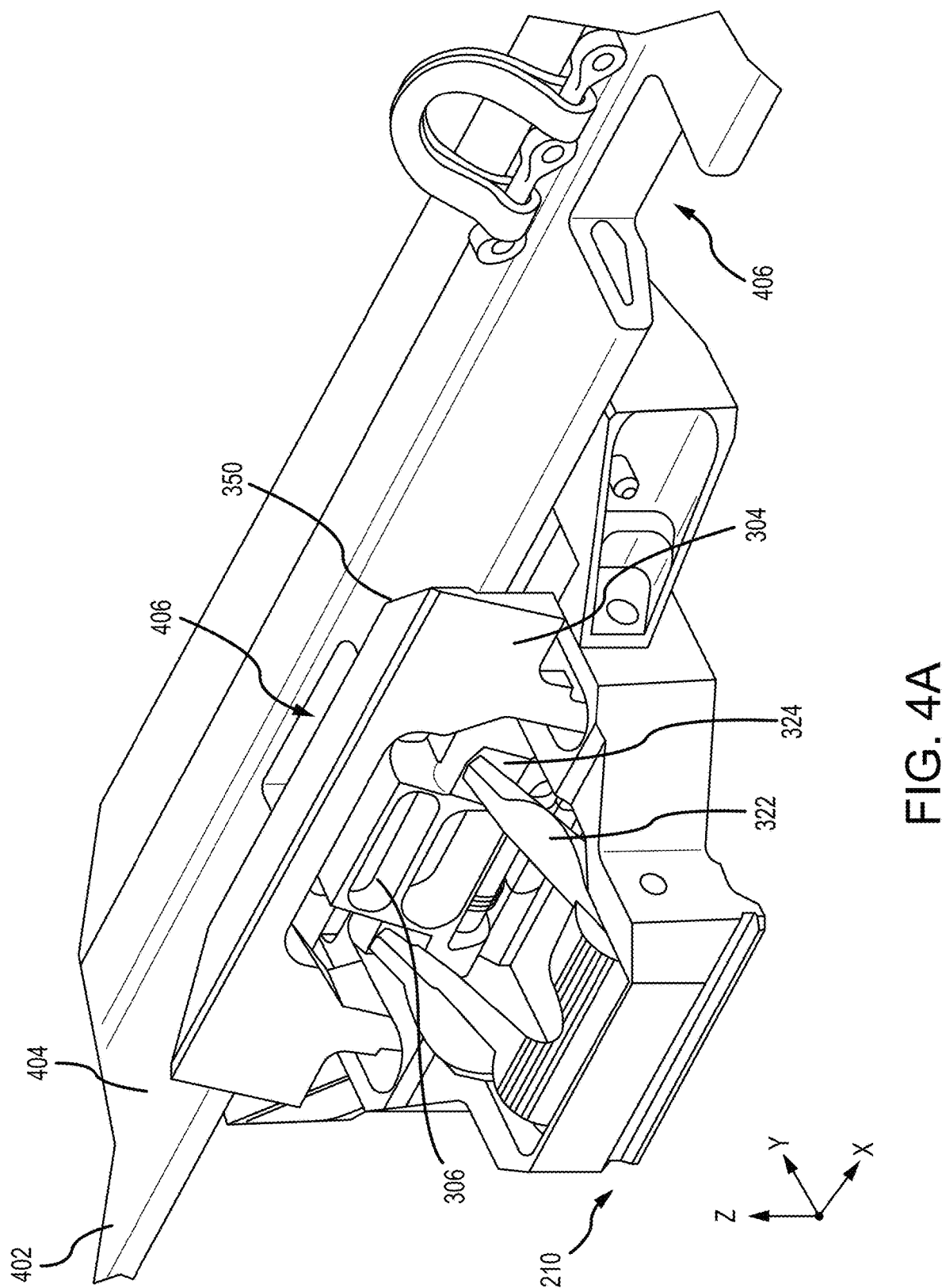

Referring now to FIGS. 4A and 3B, with continued reference to FIGS. 3A-3D, cargo restraining device 210 is illustrated restraining a pallet 402 (e.g., cargo), in accordance with various embodiments. Second restraint 306 may be engaged after the pallet 402 stops moving and is to be secured. FIG. 4A illustrates a perspective view of cargo restraining device 210 and pallet 402. FIG. 4B illustrates a perspective view of cargo restraining device 210 and pallet 402. Pallet 402 includes a lip 404 formed around the perimeter of pallet 402 and notches 406 formed at intervals within lip 404. Pallet 402 rests on rollers 308 with first restraint 304 preventing lateral (e.g., the Y direction) and vertical (e.g., the Z direction) movement of pallet 402, specifically, prevent movement of lip 404. Second restraint 306 is moved to the engaged position with second restraint 306 fitting into one of notches 406, as illustrated. In various embodiments, second restraint 306 may be used with different pallet and cargo types and may interface, or engage, with the various pallets and/or cargo with or without the use of notches, such as notches 406.

Cargo restraining device 210 further includes support first springs 320 and support 322 for supporting second restraint 306 in the engaged position. First springs 320 are biased to retract, or lower, second restraint 306 into the disengaged position. Support 322 is configured to engage second restraint 306 and secure second restraint 306 in the engaged position. Second restraint 306 includes shoulders 324 configured to receive and engage support 322. Support 322 moves upward (e.g., the Z direction) and slides over shoulders 324 of second restraint 306 as second restraint 306 is raised into the engaged position. A backside of shoulders 324 catches support 322, securing both second restraint 306 and support 322 in the engaged position. To disengage second restraint 306, support 322 is lifted upward (e.g., the Z direction) allowing first springs 320 to retract second restraint 306 into the disengaged position.

Figure 5A:
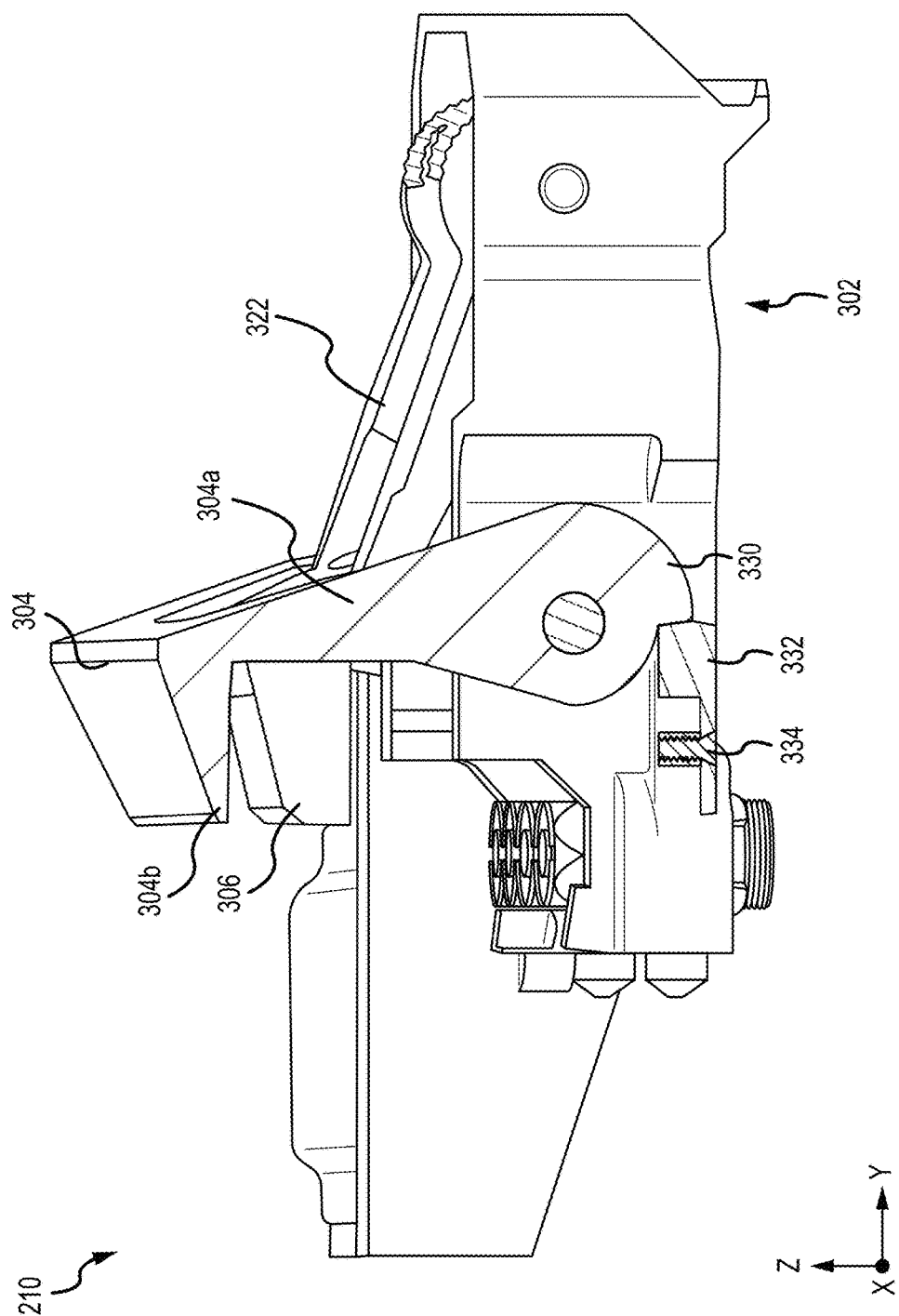
FIGS. 5A and 5B illustrate cross sections of a cargo restraining device, in accordance with various embodiments.
Figure 5B:
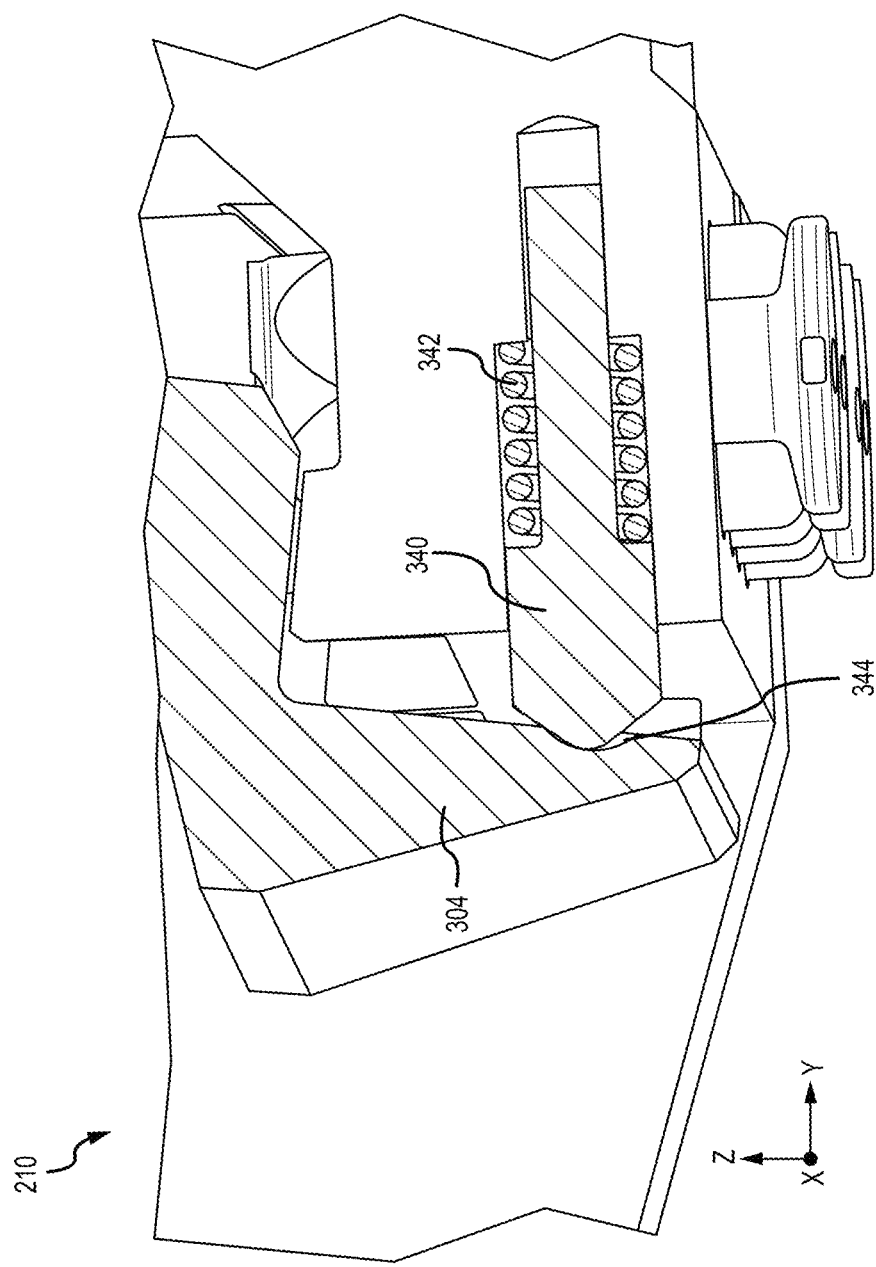

Referring now to FIGS. 5A and 5B, with continued reference to FIGS. 3A-3D, 4A, and 4B, cross section views of cargo restraining device 210, and more specifically, of first restraint 304, are illustrated, in accordance with various embodiments. First restraint 304 includes a vertical member 304*a* coupled to a horizontal member 304*b* to form an L shape. Vertical member 304*a* has a first end coupled to horizontal member 304*b* and a second end having a rounded end 330, as illustrated in FIG. 5A. Cargo restraining device 210 further includes a stop 332, a stop screw 334, and second springs 336. Stop 332 is secured to base 302 using stop screw 334. Stop 332 is configured to engage rounded end 330 of first restraint 304 to hold first restraint 304 in the engaged position. In various embodiments, rounded end 330 includes a shoulder to engage stop 332, transferring the load from first restraint 304 to base 302. Second springs 336 are biased to the engaged position. That is, second springs 336 are configured to move first restraint 304 into the engaged position (e.g., rotate clockwise as illustrated in FIG. 5A). Rounded end 330 engages stop 332 preventing first restraint from moving past the engaged position.

FIG. 5B illustrates first restraint 304 in the disengaged position. Cargo restraining device 210 further includes detent 340 and a spring 342 inside a cavity 343 of base 302. Detent 340 may move into base 302 (e.g., the Y direction), compressing spring 342, and out of base 302 (e.g., the negative Y direction), spring 342 expanding, without detent 340 leaving base 302. Detent 340 is configured to interface with a cutout 344 on horizontal member 304*b* of first restraint 304. As first restraint 304 is moved into the disengaged position, horizontal member 304*b* engages detent 340 and forces detent 340 into base 302 until detent 340 reaches cutout 344. Upon reaching cutout 344, spring 342 forces detent 340 into cutout 344, holding first restraint 304 in the disengaged position. The friction of detent 340 in cutout 344 is sufficient to overcome the force of second springs 336 that are biased to move first restraint 304 into the engaged position.

In various embodiments, first restraint 304 includes a feature 350 that allows an operator to grasp horizontal member 304*b* and pull first restraint 304 upward (e.g., the Z direction). In so doing, the operator overcomes the friction of detent 340 in cutout 344, releasing first restraint 304 and allowing second springs 336 to move first restraint into the engaged position. In various embodiments, first restraint 304 includes beveled edges along horizontal member 304*b* to guide pallet 402 when moving and reduce the chances of pallet 402 catching on first restraint 304 when moving pallet 402. In various embodiments, first restraint 304 includes beveled edges along vertical member 304*a* to guide pallet 402 when moving and reduce the chances of pallet 402 catching on first restraint 304.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cargo restraining device, comprising:
a base, the base including a detent and a spring disposed within the base, the detent configured to move in a lateral direction to compress the spring;
a first restraint coupled to the base, the first restraint including a vertical member coupled orthogonally to a horizontal member and configured to move from a raised position to a lowered position, the first restraint configured to restrain a pallet in the lateral direction and a vertical direction when in the raised position, the horizontal member having a cutout configured to interface with the detent, and the horizontal member extending in the lateral direction when in the raised position; and
a second restraint coupled to the base and configured to move from an engaged position to a disengaged position, the second restraint configured to restrain the pallet in a longitudinal direction that is orthogonal to the lateral direction when in the engaged position, wherein the first restraint is configured to move between the raised position and the lowered position independently of the second restraint moving between the engaged position to the disengaged position, and wherein the second restraint is configured to move between the engaged position to the disengaged position independently of the first restraint moving between the raised position and the lowered position;
wherein the spring is configured to force the detent into the cutout to hold the first restraint in the lowered position.

2. The cargo restraining device of claim 1, further comprising:
a rounded end formed in the horizontal member of the first restraint, opposite the vertical member;
a first spring configured to move the first restraint from the lowered position to the raised position; and
a stop configured to engage the rounded end of the first restraint to hold the first restraint in the raised position.

3. The cargo restraining device of claim 2, wherein the detent is spring loaded.

4. The cargo restraining device of claim 1, further comprising:
a shoulder formed in the second restraint;
a second spring configured to move the second restraint from the engaged position to the disengaged position; and
a support configured to engage the shoulder of the second restraint to secure the second restraint in the engaged position.

5. The cargo restraining device of claim 1, further comprising:
a tension stud coupled to the base; and a shear plunger coupled to the base adjacent the tension stud, wherein the tension stud and the shear plunger are configured to engage a first cargo infrastructure and secure the base of the cargo restraining device to the first cargo infrastructure.

6. The cargo restraining device of claim 5, further comprising:
a tension bar coupled to the base opposite the tension stud, the tension bar configured to engage a second cargo infrastructure and secure the base to the second cargo infrastructure.

7. A cargo restraining system, comprising:
a first seat-track including a first inside track and a first outside surface;
a second seat-track disposed adjacent the first seat-track including a second inside track and a second outside surface; and
a cargo restraining device, including:
a base having a top side and a bottom side with a detent and a spring disposed therebetween, the detent configured to move in a lateral direction to compress the spring;
a tension stud coupled to the bottom side of the base, the tension stud configured to engage the first inside track of the first seat-track;
a shear plunger extending through the base adjacent the tension stud, the shear plunger configured to translate with respect to the base and engage the first outside surface of the first seat-track;
a tension bar coupled to the bottom side of the base and configured to engage the second inside track of the second seat-track;
a first restraint including a vertical member coupled orthogonally to a horizontal member, the horizontal member extending in the lateral direction when in the raised position and having a cutout configured to interface with the detent, the first restraint configured to move between a raised position and a lowered position, the first restraint coupled to the top side of the base, the first restraint configured to restrain a pallet in a lateral direction when in the raised position; and
a second restraint having an engaged position and a disengaged position, the second restraint coupled to the top side of the base adjacent the first restraint, the second restraint configured to restrain the pallet in a longitudinal direction that is orthogonal to the lateral direction when in the engaged position, wherein the first restraint is configured to move between the raised position and the lowered position independently of the second restraint moving between the engaged position and the disengaged position, and wherein the second restraint is configured to move between the engaged position and the disengaged position independently of the first restraint moving between the raised position and the lowered position, wherein the spring is configured to force the detent into the cutout to hold the first restraint in the lowered position.

8. The cargo restraining system of claim 7, wherein the vertical member has beveled edges; and
the horizontal member has beveled edges.

9. The cargo restraining system of claim 8, wherein the cargo restraining device further includes:
a rounded end formed in the vertical member of the first restraint, opposite the horizontal member; and a stop coupled to the base and configured to engage the rounded end of the first restraint to hold the first restraint in the engaged position to restrain the pallet.

10. The cargo restraining system of claim 9, wherein the cargo restraining device further includes:
rollers coupled to the base, the rollers disposed below the vertical member when the first restraint is in the engaged position.

11. The cargo restraining system of claim 7, wherein the cargo restraining device further includes:
a shoulder formed in the second restraint;
a second spring configured to move the second restraint from the engaged position to the disengaged position; and
a support configured to engage the shoulder of the second restraint to secure the second restraint in the engaged position to restrain the pallet.

12. The cargo restraining system of claim 7, wherein the first restraint is further configured to restrain the pallet in a third direction that is orthogonal to the first direction and the second direction.

13. A cargo restraining device, comprising:
a first restraint including a vertical member coupled orthogonally to a horizontal member, the horizontal member extending in a lateral direction when in the raised position and having a cutout, the first restraint configured to move between a raised position and a lowered position, the first restraint configured to restrain a pallet in the lateral direction when in the raised position;
a spring-loaded detent disposed below the first restraint, the cutout configured to receive the spring-loaded detent to secure the first restraint in the lowered position, the spring-loaded detent configured to move in the lateral direction;
a second restraint having an engaged position and a disengaged position, the second restraint configured to restrain the pallet in a longitudinal direction that is orthogonal to the lateral direction when in the engaged position, wherein the first restraint is configured to move between the raised position and the lowered position independently of the second restraint moving between the engaged position and the disengaged position, and wherein the second restraint is configured to move between the engaged position and the disengaged position independently of the first restraint moving between the raised position and the lowered position; and
rollers configured for moving the pallet, the rollers disposed below the first restraint.

14. The cargo restraining device of claim 13, further comprising:
a rounded end formed in the first restraint;
a first spring configured to move the first restraint to a first position to restrain the pallet; and
a stop configured to engage the rounded end of the first restraint to hold the first restraint in the first position.

15. The cargo restraining device of claim 13, further comprising:
a shoulder formed in the second restraint;
a second spring configured to move the second restraint from the engaged position to the disengaged position, wherein the second restraint restrains the pallet in the engaged position; and
a support configured to engage the shoulder of the second restraint to secure the second restraint in the engaged position.

16. The cargo restraining device of claim 13, further comprising:
   a tension stud; and
   a tension bar, the tension stud and the tension bar configured to secure the cargo restraining device to a cargo compartment.

\* \* \* \* \*